United States Patent
Suarez

(10) Patent No.: US 10,111,144 B2
(45) Date of Patent: Oct. 23, 2018

(54) COMMUNICATION SYSTEM AND METHOD OF LOAD BALANCING

(71) Applicant: NEC Corporation, Minato-ku, Tokyo (JP)

(72) Inventor: Alberto Suarez, London (GB)

(73) Assignee: NEC CORPORATION, Tokyo (JP)

( * ) Notice: Subject to any disclaimer, the term of this patent is extended or adjusted under 35 U.S.C. 154(b) by 18 days.

(21) Appl. No.: 15/312,836

(22) PCT Filed: May 20, 2015

(86) PCT No.: PCT/JP2015/065153
§ 371 (c)(1),
(2) Date: Nov. 21, 2016

(87) PCT Pub. No.: WO2015/182627
PCT Pub. Date: Dec. 3, 2015

(65) Prior Publication Data
US 2017/0135003 A1     May 11, 2017

(30) Foreign Application Priority Data

May 30, 2014    (GB) .................................. 1409630.9

(51) Int. Cl.
*H04W 4/00*     (2018.01)
*H04W 36/00*    (2009.01)
(Continued)

(52) U.S. Cl.
CPC ....... *H04W 36/0094* (2013.01); *H04W 28/08* (2013.01); *H04W 36/08* (2013.01); *H04W 36/22* (2013.01); *H04W 36/0083* (2013.01)

(58) Field of Classification Search
CPC . H04W 36/0094; H04W 36/08; H04W 36/22; H04W 28/08
(Continued)

(56) References Cited

U.S. PATENT DOCUMENTS 6,507,567 B1 *  1/2003  Willars ................. H04W 76/04
                                                     370/321
9,392,535 B2 *  7/2016  Yuk ....................... H04W 56/00
(Continued)

FOREIGN PATENT DOCUMENTS

EP      1895801 A1      3/2008
EP      2341732 A1      7/2011
(Continued)

OTHER PUBLICATIONS

3rd Generation Partnership Project; Technical Specification Group Radio Access Network; Evolved Universal Terrestrial Radio Access Network (E-UTRAN); X2 application protocol (X2AP), (Release 12), 3GPP TS 36.423, V12.1.0 (Mar. 2014).
(Continued)

*Primary Examiner* — Thai Hoang

(57) ABSTRACT

A communication system is disclosed comprising a first base station operating a first cell and a second base station operating a second cell. The first base station determines that load should be offloaded from the first cell towards the second cell based on a comparison of respective measurement result of a first type obtained for the first and second cells. The first base station controls load balancing based on a second comparison of respective measurement result of a second type for each of the first and second cells, wherein a second condition, when met, indicates that the base station operating the second cell will not offload load to the first cell based on the respective measurement result of the second type for the first and second cells.

14 Claims, 7 Drawing Sheets

(51) Int. Cl.
*H04W 28/08* (2009.01)
*H04W 36/22* (2009.01)
*H04W 36/08* (2009.01)

(58) Field of Classification Search
USPC .......... 370/229–238, 331–333; 455/436–444
See application file for complete search history.

(56) References Cited

U.S. PATENT DOCUMENTS

| | | |
|---|---|---|
| 2004/0266474 A1 | 12/2004 | Petrus |
| 2008/0095048 A1 | 4/2008 | Zhong |
| 2011/0039564 A1 | 2/2011 | Johnstone et al. |
| 2011/0211560 A1 | 9/2011 | Yamamoto et al. |
| 2012/0213107 A1 | 8/2012 | Jang et al. |
| 2012/0230191 A1 | 9/2012 | Fang |
| 2012/0231824 A1 | 9/2012 | Budic et al. |
| 2013/0072201 A1 | 3/2013 | Nakamura et al. |
| 2013/0072202 A1* | 3/2013 | Nakamura ............ H04W 16/08 455/445 |
| 2013/0229942 A1 | 9/2013 | Kubota et al. |
| 2013/0310043 A1 | 11/2013 | Bakker et al. |
| 2014/0323131 A1* | 10/2014 | Yun ....................... H04W 36/28 455/436 |
| 2015/0138962 A1* | 5/2015 | Tipton .................. H04W 28/08 370/230 |
| 2015/0189557 A1* | 7/2015 | Touati ............... H04W 36/0066 370/332 |
| 2015/0304889 A1* | 10/2015 | Qian ................... H04W 28/085 370/235 |

FOREIGN PATENT DOCUMENTS

| | | |
|---|---|---|
| EP | 2451214 A1 | 5/2012 |
| EP | 2482588 A1 | 8/2012 |
| JP | 2007-521745 A | 8/2007 |
| JP | 2008-508773 A | 3/2008 |
| JP | 2008-211645 A | 9/2008 |
| JP | 2011-182009 A | 9/2011 |
| JP | 2011-250213 A | 12/2011 |
| JP | 2014-504122 A | 2/2014 |
| KR | 10-2012-0055654 A | 5/2012 |
| WO | 2012/073410 A1 | 6/2012 |
| WO | 2013/115696 A1 | 8/2013 |

OTHER PUBLICATIONS

International Search Report for PCT Application No. PCT/JP2015/065153, dated Sep. 23, 2015.
Written opinion of the International Search Report for PCT Application No. PCT/JP2015/065153.
Japanese Office Action for JP Application No. 2016-570052 dated Dec. 6, 2017 with English Translation.
Korean Office Action for JP Application No. 10-2016-7036994 dated Dec. 18, 2017 with English Translation.

* cited by examiner

COMMUNICATION SYSTEM AND METHOD OF LOAD BALANCING

TECHNICAL FIELD

The present invention relates to a cellular or wireless telecommunications network, and particularly but not exclusively to optimisation of load distribution in a radio access network. The invention has particular but not exclusive relevance to wireless telecommunications networks implemented according to the Long Term Evolution (LTE) standard specified by the 3rd Generation Partnership Project (3GPP).

BACKGROUND ART

In 3GPP LTE networks, a base station (i.e. evolved NodeB, eNB) of a Radio Access Network (RAN) transmits data and signalling between a core network (CN) and User Equipment (UEs) located within the base station's coverage area. Base stations of a RAN typically include a number of 'regular' or 'macro' base stations and a number of 'small cell' or 'pico' base stations (often referred to as low power nodes, LPNs). In LTE, the RAN is referred to as the Evolved Universal Terrestrial Radio Access (E-UTRA) network (E-UTRAN) and the core network is referred to as the Evolved. Packet Core (EPC) network. User equipment may comprise, for example, mobile telephones, mobile communication devices, user communication devices, laptop computers, and/or the like.

In LTE networks, a number of different load metrics can be exchanged between neighbouring base stations by means of a suitable base station to base station interface, such as an 'X2' interface and/or the like. As described in sections 9.1 and 9.2 of 3GPP TS 36.423, such load metrics include one or more of:

Composite Available Capacity (CAC);
Physical Resource Block (PRB) usage: i) for Guaranteed Bit Rate (GBR) bearers; ii) for non-GBR bearers; or iii) both;
Transport Network Layer (TNL) load; and
hardware (HW) load.

Each of these measurements can be reported separately for the (UL) and the Downlink (DL).

The so-called Mobility Load Balancing (MLB) function is responsible for optimising the mobility parameter configuration of the network nodes (e.g. base stations) in order to balance the distribution of load in the network. The MLB relies on information, including the above metrics, exchanged between neighbouring base stations.

Generally, the base station initiating the load balancing procedure determines which measurements need to be reported by which base station(s) and processes the reported measurements in order to determine whether it is necessary to adjust any associated mobility parameters. Typically, the MLB function performs offloading if the load in the served cell is at least a margin greater than the load reported by the neighbour cell. The purpose of the margin is to prevent oscillations and too frequent parameter changes. Although the different load metrics may be correlated, there might still be imbalances in opposite directions between two cells when different metrics or link directions (uplink/downlink) are considered by the MLB function.

Such imbalances may result in conflicts between the base stations, i.e. the base station operating cell A may try to offload towards cell B whilst, either simultaneously or subsequently, the base station operating cell B may try to offload towards cell A.

SUMMARY OF INVENTION

It is therefore an object of the present invention to improve performance of the communication networks and to improve the ways in which offloading can be performed between cells.

In one aspect, the invention provides a base station operating a cell in a communication network comprising a plurality base stations each operating a respective cell for communicating with a plurality of user communication devices, the base station comprising means for obtaining: i) a measurement result of a first type for a first cell operated by said base station; ii) information identifying a measurement result of said first type for a second cell operated by a different base station of said plurality of base stations; iii) a measurement result of a second type for said first cell; and iv) information identifying a measurement result of said second type for said second cell. The base station comprises: means for determining whether a first condition is met based on a comparison of the respective measurement result of a first type for each of said first and second cells, wherein said first condition, when met, indicates that load should be offloaded from said first cell towards said second cell; means for determining whether a second condition is met based on a comparison of the respective measurement result of a second type for each of said first and second cells, wherein said second condition, when met, indicates that said different base station will not offload load from said second cell to said first cell based on the respective measurement result of a second type for each of said first and second cells; and controlling means for controlling a load balancing based on said determining, when at least said first condition and said second condition is met, wherein said controlling means is operable to initiate offloading of load from said first cell towards said second cell.

In one aspect, the invention provides a base station operating a cell in a communication network comprising a plurality base stations each operating a respective cell for communicating with a plurality of user communication devices, the base station comprising a transceiver and a processor, wherein said transceiver is configured to obtain: i) a measurement result of a first type for a first cell operated by said base station; ii) information identifying a measurement result of said first type for a second cell operated by a different base station of said plurality of base stations; iii) a measurement result of a second type for said first cell; and iv) information identifying a measurement result of said second type for said second cell. The processor is configured to: determine whether a first condition is met based on a comparison of the respective measurement result of a first type for each of said first and second cells, wherein said first condition, when met, indicates that load should be offloaded from said first cell towards said second cell; determine whether a second condition is met based on a comparison of the respective measurement result of a second type for each of said first and second cells, wherein said second condition, when met, indicates that said different base station will not offload load from said second cell to said first cell based on the respective measurement result of a second type for each of said first and second cells; and control a load balancing based on said determining whether said first condition is met and said determining whether said second condition is met, when at least one of said first condition and said second condition is met, wherein said processor is operable to initiate offloading of load from said first cell towards said second cell.

In one aspect, the invention provides a system comprising the above described base station, a base station operating said second cell, and at least one user communication device.

In one aspect, the invention provides a method performed by a base station operating a cell in a communication network comprising a plurality base stations each operating a respective cell for communicating with a plurality of user communication devices, the method comprising obtaining: i) a measurement result of a first type for a first cell operated by said base station; ii) information identifying a measurement result of said first type for a second cell operated by a different base station of said plurality of base stations; iii) a measurement result of a second type for said first cell; and iv) information identifying a measurement result of said second type for said second cell. The method comprises determining whether a first condition is met based on a comparison of the respective measurement result of a first type for each of said first and second cells, wherein said first condition, when met, indicates that load should be offloaded from said first cell towards said second cell; determining whether a second condition is met based on a comparison of the respective measurement result of a second type for each of said first and second cells, wherein said second condition, when met, indicates that said different base station will not offload load from said second cell to said first cell based on the respective measurement result of a second type for each of said first and second cells; and controlling a load balancing based on said determining, when at least said first condition and said second condition is met, wherein said controlling is operable to initiate offloading of load from said first cell towards said second cell.

The invention provides, for all methods disclosed, corresponding computer programs or computer program products for execution on corresponding equipment, the equipment itself (user equipment, nodes or components thereof) and methods of updating the equipment.

BRIEF DESCRIPTION OF DRAWINGS

An exemplary embodiment of the invention will now be described, by way of example, with reference to the accompanying drawings in which.

DESCRIPTION OF EMBODIMENTS

Overview

Figure 1:
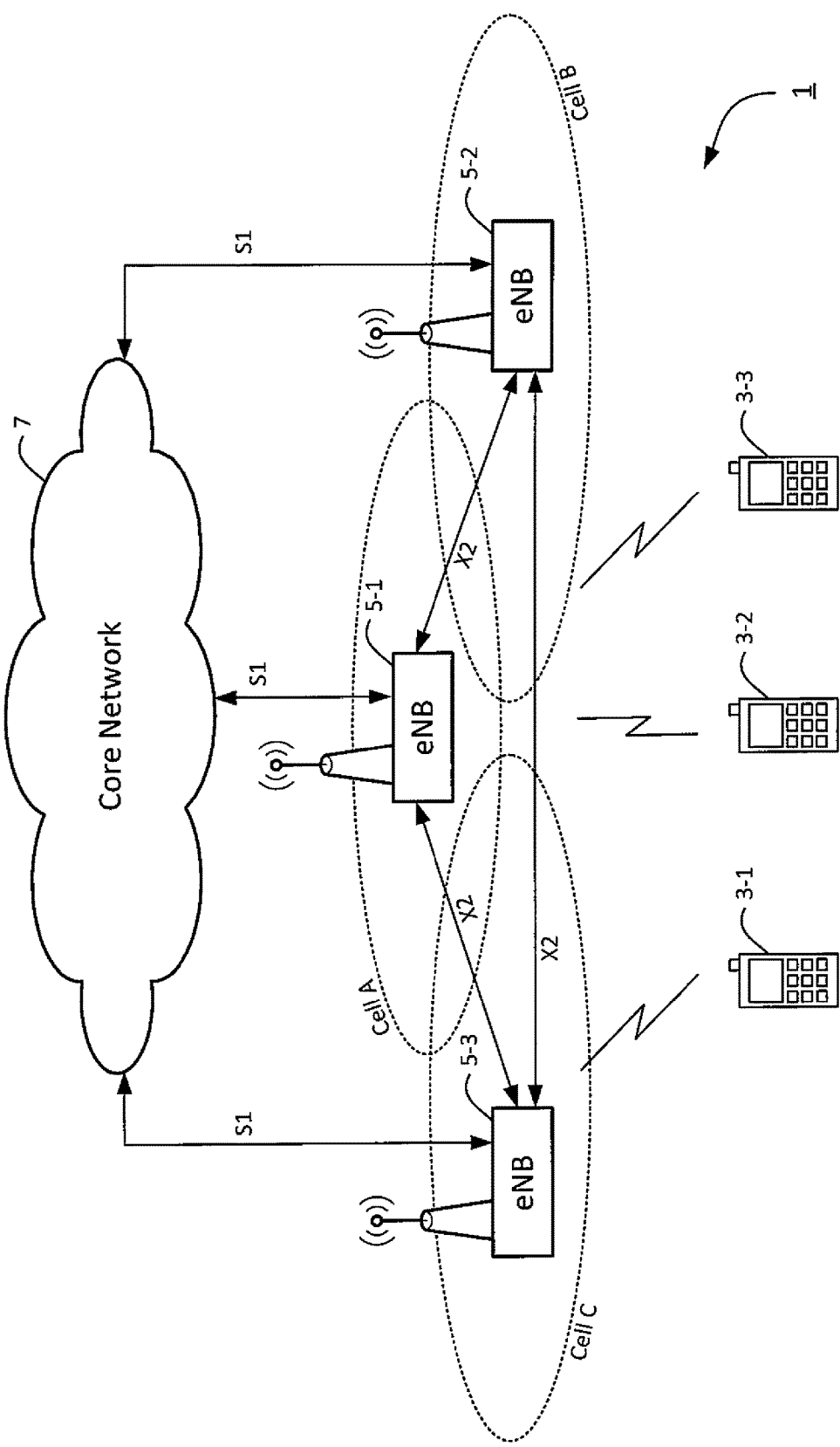
FIG. 1 schematically illustrates a mobile telecommunication system of a type to which the invention is applicable.

FIG. 1 schematically illustrates a mobile (cellular) telecommunication system 1 including a plurality of mobile communication devices 3-1 to 3-3 (each of which comprises a mobile telephone or other compatible user equipment) and a plurality of base stations 5-1 to 5-3, each of which operates an associated cell (Cells A to C, respectively). Any of the base stations 5-1 to 5-3 may comprise a regular macro eNB and/or a small cell base station (such as Home evolved NodeB (HeNB), pico or femto base station, and/or the like).

In this example, the first mobile communication device 3-1 is initially served via cell C operated by the third base station 5-3 and the second and third mobile communication devices 3-2 and 3-3 are initially served via Cell A operated by the first base station 5-1. As those skilled in the art will appreciate, whilst three mobile communication devices 3 and three base stations 5 are shown in FIG. 1 for illustration purposes, additional user equipment and/or base stations may be present in a deployed system. It will also be appreciated that each base station 5 may operate more than one cell.

Communication between each of the base stations 5 and a core network 7 is via a so-called 'S1' interface. The core network 7 typically includes, amongst others, a home subscriber server (HSS), a mobility management entity (MME), a serving gateway (S-GW), and a Packet Data Network (PDN) Gateway (P-GW), which have been omitted for sake of simplicity.

An 'X2' interface is also provided for communication between neighbouring base stations 5 to facilitate data exchange between them (either directly, or via other nodes, such as a small cell gateway, X2 gateway, and/or the like).

In the mobile telecommunication system 1, the base stations 5 are beneficially configured to perform mobility load balancing by taking into account a plurality of load metrics reported by their respective neighbour base stations. For example, the first base station 5-1 is configured to request a number of load metrics to be reported by at least one of the other base stations 5-2 and 5-3, either periodically, or when the first base station 5-1 determines that its own load is above a predetermined threshold. The other base stations 5-2 and 5-3 generate and send the load metrics to the requesting base station 5-1, based on which the MLB function can determine whether or not offloading shall be initiated towards one or more of the neighbouring cells B and C.

However, conflicts may still arise when only a subset of the metrics are requested or are taken into account by the MLB function to determine the base stations' offloading decision, and/or when different base stations make an offloading decision based on different set of metrics. For example, in the downlink direction, the PRB usage of a cell (e.g. cell A) may be greater than the PRB usage of another cell (e.g. cell B) plus a predetermined margin. This can be expressed as $PRB_{DL}(\text{cell A}) > PRB_{DL}(\text{cell B}) + \text{margin}$. At the same time, however, in the uplink direction the PRB usage of cell B may be greater than the PRB usage of cell A plus the predetermined margin ($PRB_{UL}(\text{cell B}) > PRB_{UL}(\text{cell A}) + \text{margin}$). Such conflicts may result in repeated (unnecessary) handovers of one or more UEs between the cells, and in subsequent performance degradation for the affected users and in an increase in signalling load.

In this exemplary embodiment, the MLB function of the first base station 5-1 is configured to compare a first metric of the reported plurality of metrics for its own cell (Cell A) with the corresponding metric for the neighbour's cell (i.e. Cell B in case of the second base station 5-2 and Cell C in case of the third base station 5-3) and to compare each different metric reported for the neighbour's cell (e.g. all metrics other than the first metric) with the corresponding metric obtained for its own cell, in order to determine whether a particular neighbour cell is an appropriate candidate for offloading. Specifically, a particular cell is determined to be an appropriate candidate for offloading, if the following conditions are fulfilled:

there exists a first metric $Q_i$ for which $Q_i(A) \geq Q_i(B) + M_1(i)$      (1)

and for all other 'secondary' metrics $Q_k$ (with $k \neq i$), 
$Qk(B) \leq Q_k(A) + (M_1(k) - \delta(k))$      (2)

where '$M_1$' is a respective margin defined for each of the load metrics; 'A' and 'B' denote Cells A and B, respectively; and '$\delta$' is a predetermined offset applied to the margin $M_1$ for condition (2).

In other words, the MLB function of the first base station 5-1 determines a particular cell to be an appropriate candidate for offloading, if: (1) there is at least a first metric ($Q_i$) indicating a load in the cell of the first base station 5-1 (Cell A) which is at least a margin ($M_1$) greater than the load indicated by the first metric ($Q_i$) reported for the neighbour cell (e.g. Cell B); and (2) for any other metric than the first metric, the metric ($Q_k$) indicating a load reported for the handover candidate cell (e.g. Cell B) is equal or less than the load indicated by that metric ($Q_k$) for the first base station's 5-1 cell (Cell A) plus the margin ($M_1$) minus a predetermined offset ($\delta$) associated with that metric.

The margin $M_1$ may be predetermined (e.g. specific to the base station 5, the cell, and; or the RAN) and/or there may be a separate margin $M_1$ for each type of load metrics, where appropriate. Effectively, the margin $M_1$ in condition (2) serves to reduce the likelihood of a 'reverse' offloading from Cell B to Cell A based on the first metric in a subsequent MLB processing (by the second base station 5-2), whilst the offset '$\delta$' serves to reduce the likelihood of a reverse offloading based on the other metric $Q_k$. Thus, beneficially, potential conflicts between the MLB functions of the neighbouring base stations 5 can be prevented, which in turn may reduce the need for unnecessary signalling and handovers between the base stations 5.

Thus effectively, the MLB function of the first base station 5-1 takes into account not only those metric(s) that may result in an offloading from Cell A to Cell B, but also those metrics that may be used by the MLB function of the neighbour base station 5-2 when considering a subsequent offloading from Cell B to Cell A.

The 'general' condition (1) may also involve an activation threshold for Cell A, in which case the value of a particular load metric needs to be above its activation threshold (associated with the given load metric) before considering condition (2). In other words, prior to checking condition (2), the following inequality needs to be fulfilled: $Q_i(A) \geq Th_{ACT}(i)$. The activation threshold beneficially prevents the MLB function from initiating an offloading (and associated signalling) when the load indicated by a particular metric is low (albeit it may be greater than the load of a neighbour cell indicated by that metric).

In a modification of the above condition (2), herein denoted condition (2'), the MLB function is configured to take into account a threshold (either absolute or relative) when enforcing the modified condition (2)—herein referred to as condition (2'). In this case, a particular cell is determined to be an appropriate candidate for offloading, if the following conditions are fulfilled:

there exists a metric $Q_i$ for which $Q_i(A) \geq Q_i(B) + M_1(i)$      (1)

and for all other metrics $Q_k$ (with $k \neq i$): $Q_k(B) \leq \max(Q_k(A) + (M_1(k) - \delta(k)), Th(i,k), Q_i(A) - M_2(i,k))$      (2')

where '$M_1$' is a respective margin defined for each of the load metrics; '$M_2$' is a margin dependent on the (e.g. specific) combination of the load metrics 'i' and 'k' being compared; 'Th(i,k)' is a threshold for applying condition (2'); 'A' and 'B' denote Cells A and B, respectively; and '$\delta$' is a predetermined offset applied to the margin $M_1$ for condition (2').

In other words, the MLB function of the first base station 5-1 determines a particular cell to be an appropriate candidate for offloading, if: (1) there is at least a first metric ($Q_i$) indicating a load in the cell of the first base station 5-1 (Cell A) which is at least a margin ($M_1$) greater than the load indicated by the first metric ($Q_i$) reported for the neighbour cell (e.g. Cell B); and (2) for any other metric than the first metric, the metric ($Q_k$) indicating a load reported for the handover candidate cell (e.g. Cell B) is equal or less than the larger one of:
  i) a load indicated by that metric ($Q_k$) for the first base station's 5-1 cell (Cell A) plus the margin ($M_1$) minus a predetermined offset ($\delta$) associated with that metric;
  ii) a threshold (Th(i,k)) associated with condition (2'); and
  iii) a first metric ($Q_i$) for the cell of the first base station 5-1 (Cell A) minus a margin ($M_2$) specifying a required difference between the corresponding load metrics for the two cells being compared.

The threshold 'Th(i,k)' may be referred to as an 'absolute' threshold, whereas the margin $M_2$ may be referred to as a 'relative' threshold, since $M_2$ is used for setting a minimum difference between the corresponding load metrics for two cells rather than an absolute load level.

The threshold(s) may beneficially reduce the risk of potential offloading opportunities not being considered by the MLB function, e.g. in the case when only one of the metrics is indicative of a (significantly) higher load in Cell A than in Cell B, whilst any other metrics are indicative of a lower load in Cell A than the one metric. In turn, this also reduces the risk of a potential communication issues (failure, delay, re-transmission, and/or the like) resulting from an overload in Cell A corresponding to only one type of metric (but not necessarily the other metrics).

Load Metrics

Before discussing detailed the specific ways in which the base station 5 can carry out load balancing, a brief description will be given of the load metrics agreed for LTE in 3GPP technical specification (TS) 36.423, the entire contents of which are incorporated herein by reference.

Table 1 below (which generally corresponds to Table 9.1.2.14 of TS 36.423) illustrates the contents of the 'Resource Status Update' message that may be sent between neighbouring base stations (e.g. over the X2 interface), whilst Tables 2 to 6 illustrate various information elements (IEs) relating to load metrics that may be included in the Resource Status Update messages sent between base stations.

Specifically, the 'Hardware Load Indicator' IE (Table 2) indicates the status of the Hardware Load experienced by a specific cell of the base station sending the Hardware Load Indicator IE. The 'S1 TNL Load Indicator' IE (Table 3) indicates the status of the S1 (S1 interface) Transport Network Load experienced by the cell. The 'Radio Resource Status' IE (Table 4) indicates the usage of the PRBs for all traffic in Downlink and Uplink. The 'Composite Available Capacity Group' IE (Table 5) indicates the overall available resource level in the cell in Downlink and Uplink. The 'Composite Available Capacity' IE (Table 6) indicates the overall available resource level in the cell of the base station in either Downlink or Uplink. The 'Load Indicator' IF (Table 7) indicates the status of load of a particular base station (operating one or more cells). Finally, the 'Capacity Value' IE (Table 8) indicates the amount of resources that are available at a particular base station relative to the total E-UTRAN resources of that base station.

TABLE 1

Resource Status Update message definition (Table 9.1.2.14 of TS 36.423)

| IE/Group Name | Presence | Range | IE type and reference | Semantics description | Criticality | Assigned Criticality |
|---|---|---|---|---|---|---|
| Message Type | M | | 9.2.13 | | YES | ignore |
| eNB1 Measurement ID | M | | INTEGER (1 . . . 4095, . . .) | Allocated by eNB1 | YES | reject |
| eNB2 Measurement ID | M | | INTEGER (1 . . . 4095, . . .) | Allocated by eNB2 | YES | reject |
| Cell Measurement Result | | 1 | | | YES | ignore |
| >Cell Measurement Result Item | | 1 . . . <maxCellineNB> | | | EACH | ignore |
| >>Cell ID | M | | ECGI 9.2.14 | | | |
| >>Hardware Load Indicator | O | | 9.2.34 | | | |
| >>S1 TNL Load Indicator | O | | 9.2.35 | | | |
| >>Radio Resource Status | O | | 9.2.37 | | | |
| >>Composite Available Capacity Group | O | | 9.2.44 | | YES | ignore |
| >>ABS Status | O | | 9.2.58 | | YES | ignore |

TABLE 2

Hardware Load Indicator IE definition (Table 9.2.34 of TS 36.423)

| IE/Group Name | Presence | Range | IE type and reference | Semantics description |
|---|---|---|---|---|
| DL Hardware Load Indicator | M | | 9.2.36 | |
| UL Hardware Load Indicator | M | | 9.2.36 | |

TABLE 3

S1 TNL Load Indicator IE definition (Table 9.2.35 of TS 36.423)

| IE/Group Name | Presence | Range | IE type and reference | Semantics description |
|---|---|---|---|---|
| DL S1TNL Load Indicator | M | | 9.2.36 | |
| UL S1TNL Load Indicator | M | | 9.2.36 | |

TABLE 4

Radio Resource Status IE definition (Table 9.2.37 of TS 36.423)

| IE/Group Name | Presence | Range | IE type and reference | Semantics description |
|---|---|---|---|---|
| DL GBR PRB usage | M | | INTEGER (0 . . . 100) | |
| UL GBR PRB usage | M | | INTEGER (0 . . . 100) | |
| DL non-GBR PRB usage | M | | INTEGER (0 . . . 100) | |
| UL non-GBR PRB usage | M | | INTEGER (0 . . . 100) | |
| DL Total PRB usage | M | | INTEGER (0 . . . 100) | |
| UL Total PRB usage | M | | INTEGER (0 . . . 100) | |

TABLE 5

Composite Available Capacity Group IE definition (Table 9.2.44 of TS 36.423)

| IE/Group Name | Presence | Range | IE type and reference | Semantics description | Criticality | Assigned Criticality |
|---|---|---|---|---|---|---|
| Composite Available Capacity Downlink | M | | Composite Available Capacity 9.2.45 | For the Downlink | — | — |
| Composite Available Capacity Uplink | M | | Composite Available Capacity 9.2.45 | For the Uplink | — | — |

TABLE 6

Composite Available Capacity IE definition (Table 9.2.45 of TS 36.423)

| IE/Group Name | Presence | Range | IE type and reference | Semantics description | Criticality | Assigned Criticality |
|---|---|---|---|---|---|---|
| Cell Capacity Class Value | O | | 9.2.46 | | — | — |
| Capacity Value | M | | 9.2.47 | '0' indicates no resource is available, Measured on a linear scale. | — | — |

TABLE 7

Load Indicator Type definition, used for Hardware Load and S1 TNL load (Table 9.2.36 of TS 36.423)

| IE/Group Name | Presence | Range | IE type and reference | Semantics description |
|---|---|---|---|---|
| Load Indicator | M | | ENUMERATED (LowLoad, MediumLoad, HighLoad, Overload, . . . ) | |

TABLE 8

Capacity Value IE definition (Table 9.2.47 of TS 36.423)

| IE/GroupName | Presence | Range | IE type and reference | Semantics description | Criticality | Assigned Criticality |
|---|---|---|---|---|---|---|
| Capacity Value | M | | INTEGER (0 . . . 100) | Value 0 shall indicate no available capacity, and 100 shall indicate maximum available capacity. Capacity Value should be measured on a linear scale. | — | — |

Mobile Communication Device

Figure 2:
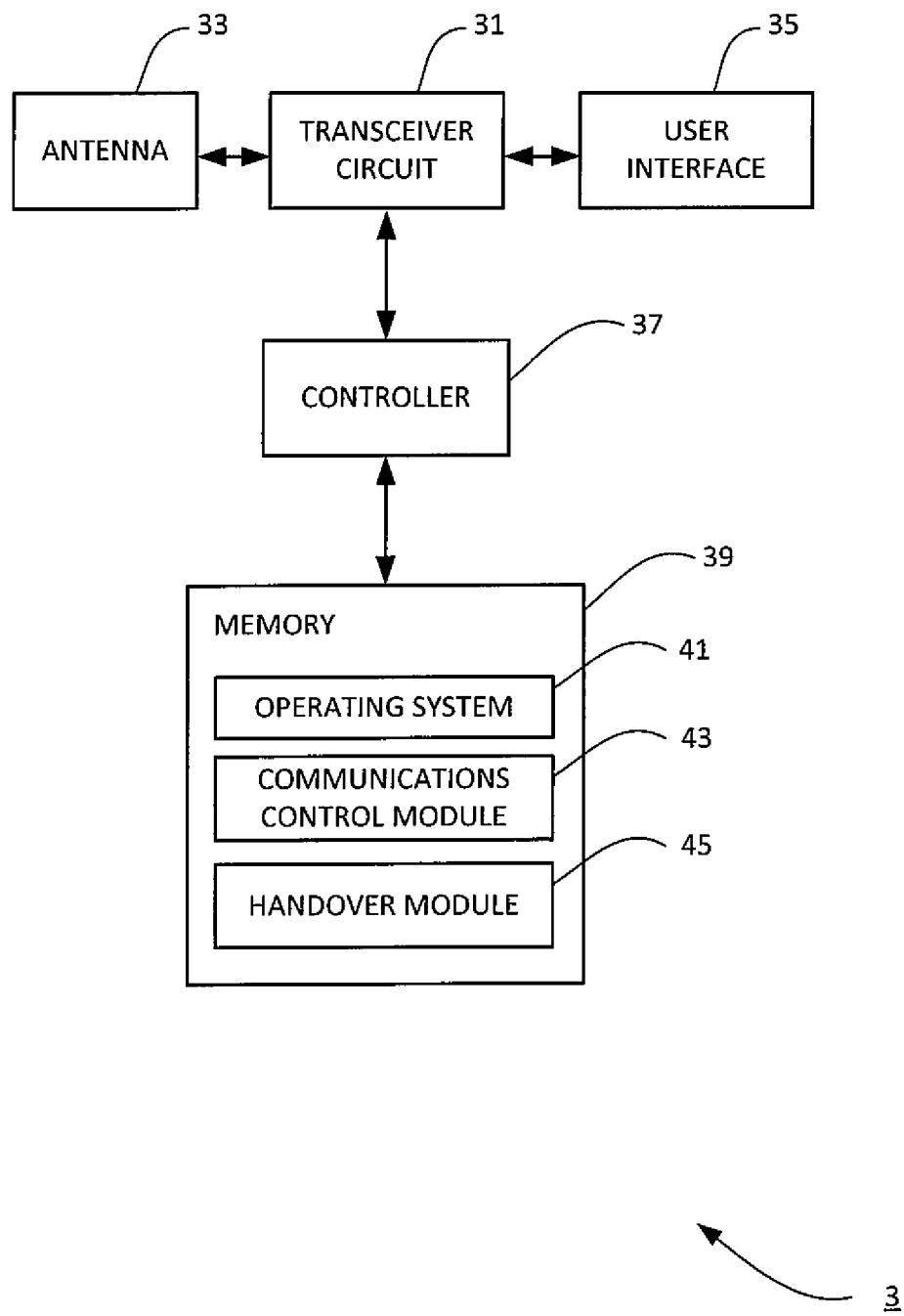
FIG. 2 is a block diagram of a mobile communication device suitable for use in the telecommunications networks of FIG. 1.

FIG. 2 is a block diagram illustrating the main components of the mobile communication device 3 shown in FIG. 1. As shown, the mobile communication device 3 has a transceiver circuit 31 that is operable to transmit signals to and to receive signals from the base station 5 via one or more antenna 33. Although not necessarily shown in FIG. 2, the mobile communication device 3 may of course have all the usual functionality of a conventional mobile telephone 3 (such as a user interface 35) and this may be provided by any one or any combination of hardware, software and firmware, as appropriate. The mobile communication device 3 has a controller 37 to control the operation of the mobile communication device 3. The controller 37 is associated with a memory 39 and is coupled to the transceiver circuit 31. Software may be pre-installed in the memory 39 and/or may be downloaded via the telecommunications network or from a removable data storage device (RMD), for example.

The controller 37 is configured to control overall operation of the mobile communication device 3 by, in this example, program instructions or software instructions stored within the memory 39. As shown, these software instructions include, among other things, an operating system 41, a communications control module 43, and a handover module 45.

The communications control module 43 is operable to control the communication between the mobile communication device 3 and the base stations 5. The communications control module 43 also controls the separate flows of uplink data and control data that are to be transmitted to the base stations 5.

The handover module 45 is responsible for complying with the base stations instructions relating to handover. Such instruction may relate to performing and reporting signal measurements with respect to one or more cells, and to perform handover to a cell (target cell) indicated by the (current) serving base station (e.g. based on the reported signal measurements and/or any load balancing metrics available to the serving base station).

Base Station

Figure 3:
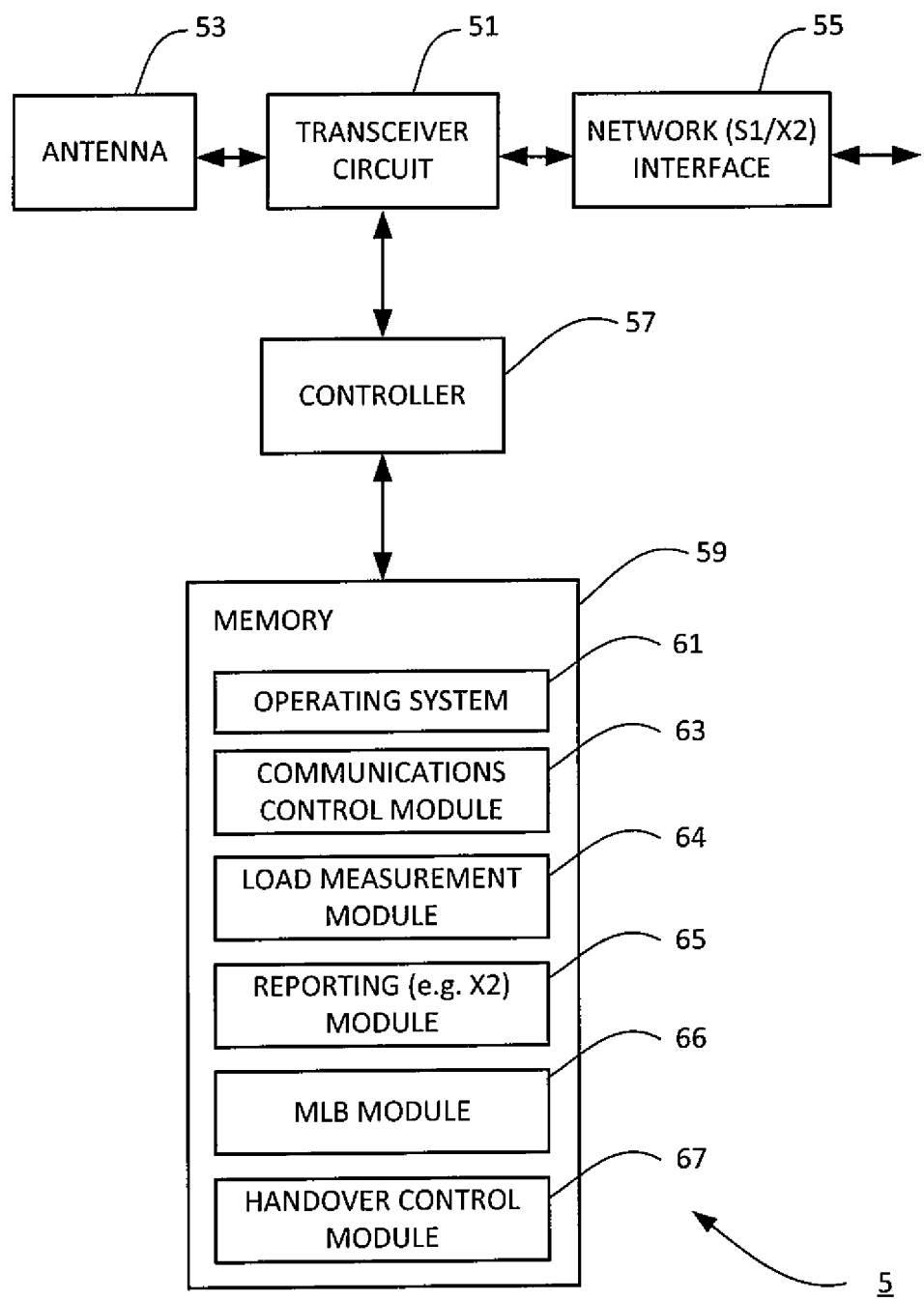
FIG. 3 is a block diagram of a base station suitable for use in the telecommunications networks of FIG. 1.

FIG. 3 is a block diagram illustrating the main components of the base stations 5-1 to 5-3 shown in FIG. 1. As shown, the base station 5 includes a transceiver circuit 51 which is operable to transmit signals to and to receive signals from the mobile communication devices 3 via one or more antennae 53 and which is operable to transmit signals to and to receive signals from the core network 7 and/or other base stations 5 via a network interface 55. The network interface 55 typically includes an S1 interface for communicating with the core network 7 and an X2 interface for communicating with the other base stations. A controller 57 controls the operation of the transceiver circuit 51 in accordance with software stored in a memory 59. The software includes, among other things, an operating system 61, a communications control module 63, a load measurement module 64, a reporting module 65, a mobility load balancing (MLB) module 66, and a handover control module 67.

The communications control module 63 is operable to control the communication between the base station 5 and the mobile communication device 3 and to control the communication between the base station 5 and other network entities (e.g. other base stations and core network entities) that are connected to the base station 5. The communications control module 63 also controls the separate flows of uplink and downlink user traffic and control data to be transmitted to the mobile communication devices 3 served by the base station 5 including, for example, control data for managing operation of the mobile communication devices 3.

The load measurement module 64 is operable to carry out measurement of current system/cell load, for example, by calculating the number of physical resource blocks currently used by GBR and/or non-GBR traffic belonging to each respective mobile communication device 3. Such measurements may be carried out periodically and/or upon detecting a trigger (such as receiving a measurement request from a neighbouring base station). The results of the load measurements may be provided, e.g. in the form of load metrics, to the other modules either directly (e.g. upon request) or via the memory 59.

The reporting module 65 is operable to handle (e.g. receive, generate, and send) messages relating to reporting of load measurements (performed by the load measurement module 64). In this example, the reporting module 65 is operable to handle messages formatted in accordance with the X2AP protocol.

The MLB module 66 is responsible for comparing load metrics for the base station's own cells (obtained from the load measurement module 64) and the corresponding load metrics obtained (via the reporting module 65) for one or more neighbouring cell(s) in order to determine whether or not to perform an offloading operation, and to which cell.

The handover control module 67 is responsible for instructing the mobile communication devices 3 served by the base station 5 to carry out procedures relating to handover. Such instruction may relate to performing and reporting signal measurements with respect to one or more cells (of the base station 5 and/or neighbouring base stations), and to perform handover to a cell (target cell) indicated by the base station 5 (e.g. based on the reported signal measurements and/or any load balancing metrics available to the MLB module 66).

In the above description, the mobile communication device 3 and the base station 5 are described for ease of understanding as having a number of discrete modules (such as the communications control modules, the load measurement module, the MLB module, and the handover module). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

Operation

As described above, a possible approach for the MLB function (MLB module 66) is to perform offloading if the load in the served cell is at least a margin greater than the load in the neighbour cell. The following description explains, with reference to FIGS. 4 to 9, some possible ways in which an offloading decision can be determined based on a number of metrics exchanged between the base stations 5, whilst also avoiding the aforementioned conflicts arising from the use of more than one of the different metrics by the different base stations 5.

As can be seen in Tables 2 to 8 above, different measurements (metrics) may have different reported granularities. For example, for CAC and PRB usage an integer value in the range 0-100 is reported, whilst for the other measurements only one of four discrete values ('low', 'medium', 'high', and 'overload') may be reported. Further, the measurements may not have the same polarity (e.g. PRB usage, HW and TNL load indicate the load in the cell, whereas CAC indicates the available capacity), i.e. some metrics express the available (unused) capacity whilst other metrics express the already used (thus unavailable) capacity (i.e. the current load). There may also be other differences between the reported metrics (e.g. the TNL or HW load may correspond to only one or to several cells controlled by a base station, whereas PRB usage or CAC always correspond to an individual cell) which may need to be addressed by an appropriate transformation even if the metrics use the same units and/or the same polarity.

The present invention also overcomes these issues by an appropriate transformation (either at the reporting base station or at the requesting base station) of the reported metrics, if necessary.

Table 9 illustrates an exemplary transformation of various metrics wherein the enumerated values 'low', 'medium', 'high', and 'overload' are obtained by comparing the actual (measured) value with a set of predetermined thresholds and by estimating the value to be the midpoint of each of the quantization intervals.

TABLE 9

Example of metric transformation

| Actual TNL load | $[0, Th_{LOW})$ | $[Th_{LOW}, Th_{MEDIUM})$ | $[Th_{MEDIUM}, Th_{HIGH})$ | $[Th_{HIGH}, 100]$ |
|---|---|---|---|---|
| Enumerated Value | Low | Medium | High | Overload |
| Transformed Value Q | $Th_{LOW}/2$ | $(Th_{LOW} + Th_{MEDIUM})/2$ | $(Th_{MEDIUM} + Th_{HIGH})/2$ | $(Th_{HIGH} + 100)/2$ |

In the following, the set of metrics exchanged between two base stations will be denoted by $Q_1, \ldots, Q_N$, where each $Q_i$ correspond to one of the metrics exchanged, after any necessary transformations have been made. In this example such transformation is preferably performed by the first base station 5-1 requesting the metrics (i.e. the neighbour base stations 5-2, 5-3 provide standard metrics), although will be appreciated that in other examples the transformation, if any, may be performed by the second and third base stations 5-2, 5-3 performing the measurements. In other words, the neighbour base stations 5-2, 5-3 may provide (transformed) metrics that are already adapted to the format required by the requesting base station's 5-1 MLB module 66 when checking conditions (1) and (2) below.

Thus, as explained above, for each neighbour base station 5-2, 5-3, the MLB module 66 of the first base station 5-1 is configured to compare the reported (and transformed, as appropriate) plurality of metrics for the neighbour's cell (i.e. Cell B in case of the second base station 5-2 and Cell C in case of the third base station 5-3) with the corresponding plurality of metrics obtained for its own cell (i.e. Cell A). Based on this comparison, the MLB module 66 determines whether a particular neighbour cell (e.g. Cell B) is an appropriate candidate for offloading, i.e. whether the following conditions are fulfilled for that cell:

there exists a metric $Q_i$ for which $Q_i(A) \geq Q_i(B) + M_1(i)$     (1)

and for all other metrics $Q_k$ (with $k \neq i$), $Q_k(B) \leq Q_k(A) + (M_1(k) - \delta(k))$     (2)

where '$M_1$' is a respective margin defined for each of the load metrics; 'A' and 'B' denote Cells A and B, respectively; and '$\delta$' is a predetermined offset applied to the margin $M_1$ for condition (2).

In other words, the MLB module 66 determines that Cell B is an appropriate candidate for offloading, if: (1) there is at least a first metric ($Q_i$) indicating a load (measured by the load measurement module 64) in the first base station's 5-1 own cell (Cell A) which is at least a margin NO greater than the load indicated by the first metric ($Q_i$) reported for Cell B (via the reporting module 65); and (2) for any other metric than the first metric, the metric ($Q_k$) indicating a load reported for Cell B is equal or less than the load indicated by that metric ($Q_k$) for Cell A plus the margin ($M_1$) minus a predetermined offset ($\delta$) associated with that metric.

Figure 4:
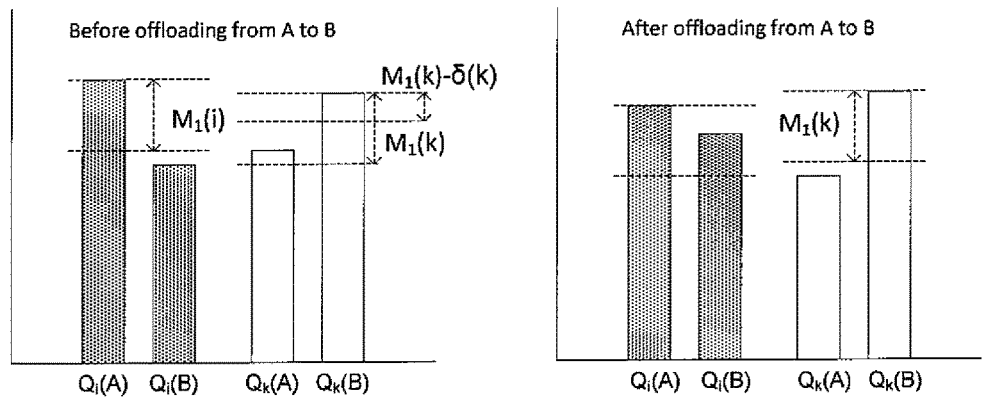
FIG. 4 illustrates exemplary load metrics in accordance with an embodiment of the invention in the telecommunications network of FIG. 1.

FIG. 4 illustrates exemplary load metrics in accordance with an embodiment of the invention in the mobile telecommunications network 1 of FIG. 1. The left hand side of FIG. 4 illustrates an exemplary scenario in which an offloading would take place from Cell A to Cell B without including the offset $\delta$ in condition (2). The likely outcome of such offloading is shown in the right hand side of FIG. 4, resulting in a potential offloading being performed in the reverse direction (from Cell B to Cell A) in a subsequent MLB iteration (assuming nothing else has changed in Cells A and B). Advantageously, however, the inclusion of the offset $\delta$ in condition (2) may prevent such offloading followed by a reverse offloading being performed, as indicated for the metric $Q_k(B)$ in the left hand side of FIG. 4.

Figure 5:
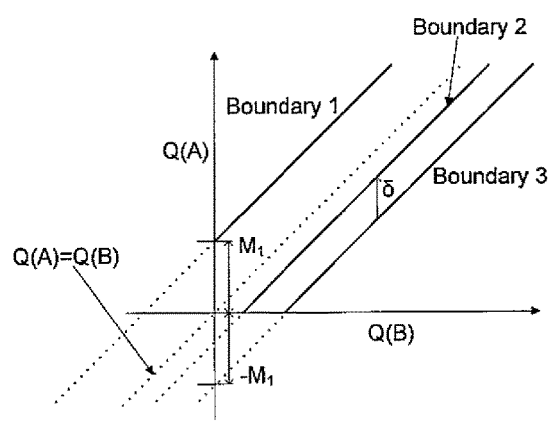
FIG. 5 illustrates an exemplary load balancing function in accordance with an embodiment of the invention in the telecommunications network of FIG. 1.

The application of offset $\delta$ and margin $M_1$ is further illustrated in FIG. 5. Specifically, FIG. 5 illustrates the metrics Q(A) and Q(B) in a plane. In this case, any value of metric Q(A) that is above Boundary 1 would trigger condition (1) for offloading from Cell A to Cell B, whereas any value of metric Q(B) that is below Boundary 3 would trigger condition (1) for offloading in the reverse direction, i.e. from Cell B to Cell A. Further, any metrics value above Boundary 2 would fulfil condition (2) for offloading from Cell A to Cell B. Therefore, by setting $\delta > 0$ it can be seen that condition (2) guarantees that condition (1) cannot be met for that same metric to offload in the reverse direction (i.e. from Cell B to Cell A). Furthermore, any metric value above Boundary 1 would already fulfil the condition (1) for offloading from Cell A to Cell B. Thus, beneficially, Boundary 2 (which is determined by the offset '$\delta$') is set to be below Boundary 1, which may be achieved by e.g. selecting the offset value $\delta$ for metric k ('$\delta(k)$') from the range [0, 2·M1(k)].

Figure 6:
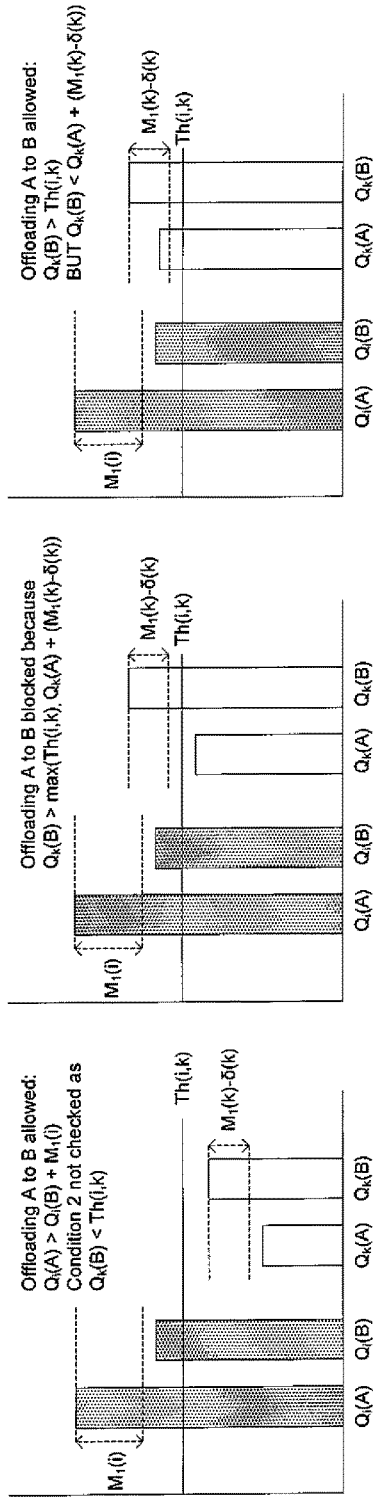
FIG. 6 illustrates exemplary load metrics in accordance with a modification of the embodiment shown in FIG. 4.

FIG. 6 illustrates exemplary load metrics in accordance with a modification of the embodiment shown in FIG. 4. The left hand side of FIG. 6 illustrates an exemplary scenario, in which condition (2) is not met, although condition (1) is met, which may thus result in a potential offloading opportunity (from Cell A to Cell B) not being considered by the MLB module 66 despite the metric $Q_i$ being indicative of a significantly higher load in Cell A than in Cell B. However, since the other metrics (e.g. in this case $Q_k$) are indicative of a lower load in Cell A than in Cell B, the combination of conditions (1) and (2) does not trigger an offloading.

However, since metric $Q_i$ is indicative of a high (potential near maximum) load for Cell A, metric $Q_i$ is likely to have a much greater impact on the performance of the first base station 5-1 than metric $Q_k$. For example, metric $Q_i$ might result in a potential blocking or dropping of bearers in Cell A, which could have been prevented by offloading some of the bearers to Cell B.

Advantageously, in such scenarios, offloading (e.g. from Cell A to Cell B) is made possible by the application of a threshold (either absolute or relative) for the enforcement of condition (2). Effectively, such a threshold results in triggering an offloading towards Cell B based on condition (1) alone. This can be expressed using the following conditions (1) and (2'), in which case, the MLB module 66 determines that a particular cell (Cell B) is an appropriate candidate for offloading (from Cell A) if the following conditions are fulfilled:

there exists a metric $Q_i$ for which $Q_i(A) \geq Q_i(B) + M_1(i)$     (1)

and for all other metrics $Q_k$ (with $k \neq i$): $Q_k(B) \leq \max(Q_k(A) + (M_i(k) - \delta(k)), Th(i,k), Q_i(A) - M_2(i,k))$     (2')

where '$M_1$' is the respective margin defined for each of the load metrics; '$M_2$' is a margin (a relative threshold) dependent on the combination of the load metrics 'i' and 'k' being compared; 'Th(i,k)' is a threshold (an absolute threshold) for applying condition (2') for metrics $Q_i$ and $Q_k$; 'A' and 'B' denote Cells A and B, respectively; and '$\delta$' is a predetermined offset applied to the margin $M_1$ for condition (2').

In other words, the MLB module 66 of the first base station 5-1 determines that Cell B is an appropriate candidate for offloading, if: (1) there is at least a first metric (Q') indicating a load in the cell of the first base station 5-1 (Cell A) which is at least a margin ($M_1$) greater than the load indicated by the corresponding first metric ($Q_i$) reported for Cell B; and (2) for any metric ($Q_k$) other than the first metric, the metric ($Q_k$) indicating a load reported for Cell B is equal or less than the larger one of:
   i) the load indicated by that metric ($Q_k$) for Cell A plus the margin ($M_1$) minus a predetermined offset ($\delta$) associated with that metric;
   ii) the (absolute) threshold associated with condition (2'); and
   iii) the first metric for Cell A minus a margin ($M_2$) specifying a required difference (or 'relative' threshold) between the corresponding load metrics for Cells A and B.

FIG. 6 illustrates the application of an absolute threshold on the operation of the MLB module 66, and the resulting offloading decisions when the above described condition (1) and condition (2') are being applied.

The left hand side of FIG. 6 illustrates a scenario in which offloading (from Cell A to Cell B) is being performed. This is because the threshold in condition (2') effectively results in $Q_k(B)$ being ignored by the MLB module 66, since $Q_k(B)$ is below the applicable threshold Th(i,k)—albeit $Q_k(B)$ being larger than the corresponding $Q_k(A)$.

However, as shown in the middle part of FIG. 6, when the metric $Q_k(B)$ is above the applicable threshold Th(i,k), and it is also larger than $Q_k(A)$ plus the margin $M_1$ minus offset δ, offloading from Cell A to Cell B is blocked by the MLB module 66.

On the other hand, the right hand side of FIG. 6 illustrates a scenario in which whilst the value of the metric $Q_k(B)$ is above the applicable threshold Th(i,k), offloading from Cell A to Cell B can still be performed after applying condition (2') because the value of metric $Q_k(B)$ is less than (or equal to) the value of $Q_k(A)$ plus the margin $M_1$ minus offset δ.

Figure 7:
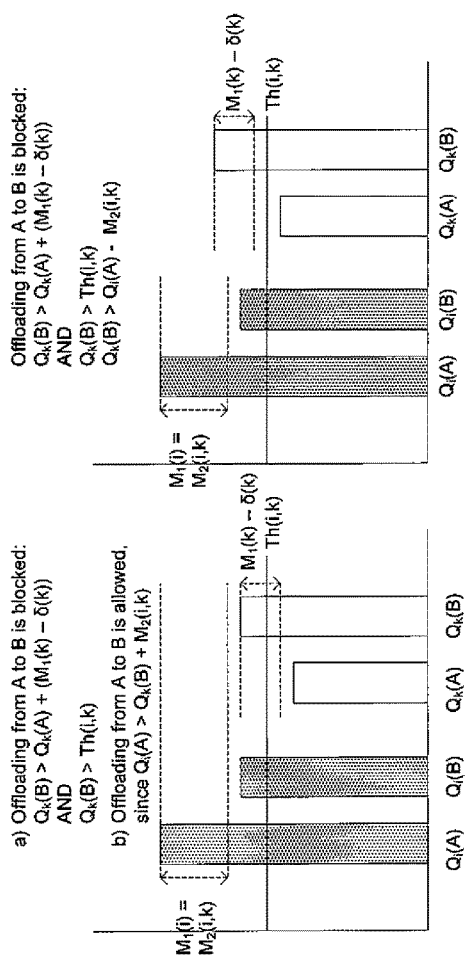
FIG. 7 is a comparison of exemplary load metrics having an absolute and a relative threshold.

FIG. 7 is a comparison of the effects of an absolute and a relative threshold on the operation of the MLB module 66, and the resulting offloading decision when the above described condition (1) and condition (2') are being applied. Specifically, the left hand side of FIG. 7 illustrates a scenario in which:

a) offloading is not allowed when applying an absolute threshold because the value of metric $Q_k(B)$ is above the applicable threshold and it is also larger than the sum of metric $Q_k(A)$ plus the margin $M_1$ minus the offset δ; and b) offloading is allowed when applying a relative threshold because the value of metric $Q_k(A)$ is above the sum of metric $Q_k(B)$ plus the margin $M_2$.

Further, the right hand side of FIG. 7 illustrates a scenario in which:

a) offloading is not allowed when applying an absolute threshold because the value of metric $Q_k(B)$ is larger than the applicable threshold, and it is also larger than the sum of metric $Q_k(A)$ plus the margin $M_1$ minus the offset δ; and b) offloading is also not allowed when applying a relative threshold because the value of metric $Q_k(B)$ is larger than the metric $Q_k(A)$ minus the margin $M_2$ and it is also larger than the sum of metric $Q_k(A)$ plus the margin $M_1$ minus the offset δ.

It will be appreciated, however, that by appropriately selecting Th(i,k) and $M_2$(i,k) the absolute and relative thresholds can be effectively disabled, so that condition (2') would always have the same effect as condition (2).

Figure 8:
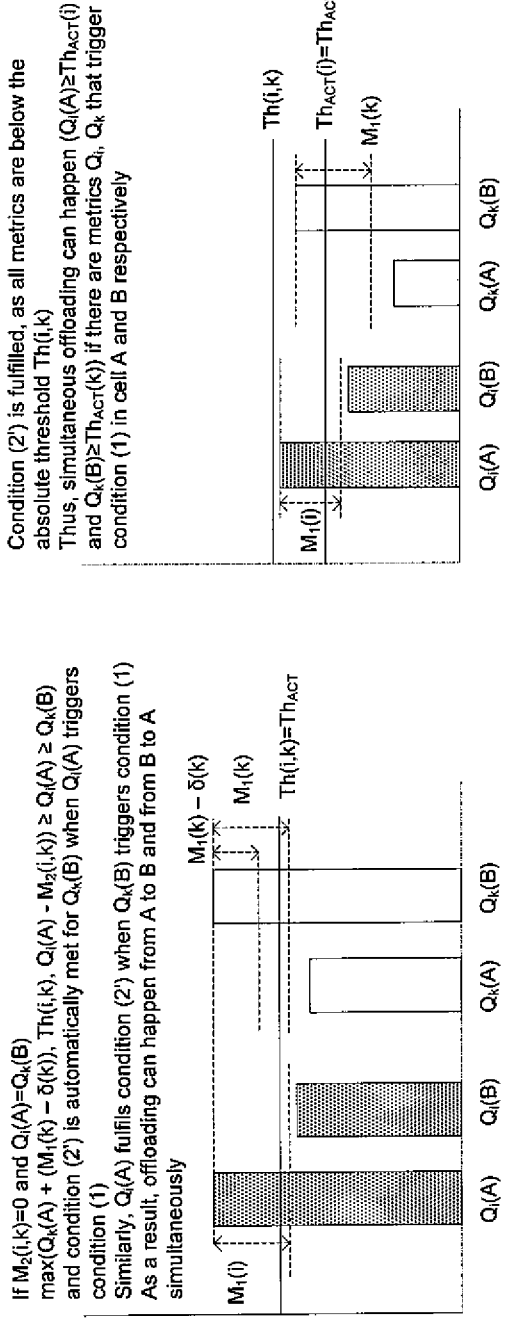
FIG. 8 illustrates exemplary load metrics in accordance with a modification of the embodiment shown in FIG. 4.

FIG. 8 illustrates exemplary load metrics in accordance with a modification of the embodiment shown in FIG. 4. In the scenarios shown in FIG. 8, two neighbouring base stations 5 may decide to initiate simultaneous offloading in the opposite directions, which may be due to the original condition (2) not being checked, e.g. when a threshold such as Th(i,k) and/or $M_2$(i,k) is being applied.

The MLB module 66 may be configured, for example, as follows:

a) the metric-dependent threshold Th(i,k) is set so that it does not exceed the activation threshold ($Th_{ACT}$), i.e. Th(i,k)≤$Th_{ACT}$(k); and b) the relative threshold is greater than zero, i.e. $M_2$(i,k)>0.

Effectively, point a) ensures that condition (2') is not skipped based on the absolute threshold if the target cell load is above the activation threshold $Th_{ACT}$. Further, point b) guarantees that at most one of the inequalities <<$Q_k(B)≤Q_i$(A)−$M_2$(i,k)>> and <<$Q_i(A)≤Q_k(B)−M_2(k,i)$>> can be true at the same time, but both could be false. In addition, condition (2') may still be true for both inequalities due to e.g. the absolute threshold, but in this case point a) would avoid the simultaneous offloading. In other words, for each pair of metrics ($Q_i$, $Q_k$) there may be either none or one cell of the two cells being compared that satisfies condition (2').

Table 10 illustrates an exemplary configuration of the MLB module 66. In this example, it is assumed that the exchanged metrics comprise: $Q_1$=PRB usage DL; $Q_2$=PRB usage UL; $Q_3$=TNL load DL; and $Q_4$=TNL load UL. In this case the MLB module 66 may be configured to directly compare the UL and DL metrics whilst avoiding a direct comparison of the TNL and PRB usage metrics. Accordingly, the exemplary threshold for each combination of metrics ($Q_1$ to $Q_4$) may be defined as illustrated in Table 10, wherein 'ε' denotes a minimum step size for a given metric:

TABLE 10 parameter definitions for metric pairs

| | $Q_k$ | | | |
|---|---|---|---|---|
| $Q_i$ | $Q_1$ | $Q_2$ | $Q_3$ | $Q_4$ |
| $Q_1$ | $M_1 = M_1$(PRB)<br>Th = 0<br>δ = 2 $M_1$(PRB) | $M_2 = M_1$(PRB)<br>Th = 0<br>δ = 2 $M_1$(PRB) | | $M_2 = ∞$<br>Th = $Th_{TNL}$<br>δ = ε(TNL) |
| $Q_2$ | $M_2 = M_1$(PRB)<br>Th = 0<br>δ = 2 $M_1$(PRB) | $M_1 = M_1$(PRB) | | |
| $Q_3$ | | $M_2 = ∞$<br>Th = ThPRB<br>δ = ε(PRB) | $M_1 = M_1$(TNL)<br>| $M_2 = M_1$(TNL)<br>Th = 0<br>δ = 2 $M_1$(TNL) |
| $Q_4$ | | | $M_2 = M_1$(TNL)<br>Th = 0<br>δ = 2 $M_1$(TNL) | $M_1 = M_1$(TNL) |

Effectively, an absolute threshold ('Th') can be turned off by setting it to '0' and a relative threshold ('$M_2$') can be turned off by setting it to '∞'.

Using the values given in Table 10 the conditions for PRB usage and TNL load metrics can be merged as follows (taking the example of i=1,2 and k=1,2).

Condition (2') becomes:

for i=1: $Q_2(B)≤\max(Q_1(A), Q_2(A))-M_1(PRB)$ for i=2: $Q_1(B)≤\max(Q_1(A), Q_2(A))-M_1(PRB)$ Together with condition (1), this can be represented as:

$\max(Q_1(A),Q_2(A))≥\max(Q_1(B), Q_2(B))+M_1(PRB)$.

Further, in combination with the conditions for TNL load metrics ($Q_3$, $Q_4$ in Table 10), the MLB module 66 may select Cell B as an offloading target if the following conditions are met:

$\mathrm{Max}(Q_1(A),Q_2(A))≥\mathrm{Max}(Q_1(B),Q_2(B))+M_1(PRB)$

AND $\mathrm{Max}(Q_3(B),Q_4(B))≤\mathrm{Max}(Th_{TNL},Q_3(A)+M_1(TNL)-ε(TNL),Q_4(A)+M_1(TNL)-ε(TNL))$

OR $\mathrm{Max}(Q_3(A),Q_4(A))≥\mathrm{Max}(Q_3(B),Q_4(B))+M_1(TNL)$

AND $\mathrm{Max}(Q_1(B),Q_2(B))≤\mathrm{Max}(Th_{PRB},Q_1(A)+M_1(PRB)-ε(PRB),Q_2(A)+M_1(PRB)-ε(PRB))$ Advantageously, the above described method is agnostic with respect to the offloading mechanism being employed, which may thus involve any appropriate adjustment of handover parameters such as handover thresholds, cell specific offsets, and/or the selection of a subset of UEs as candidates for forced offloading.

Operation—Signalling

Figure 9:
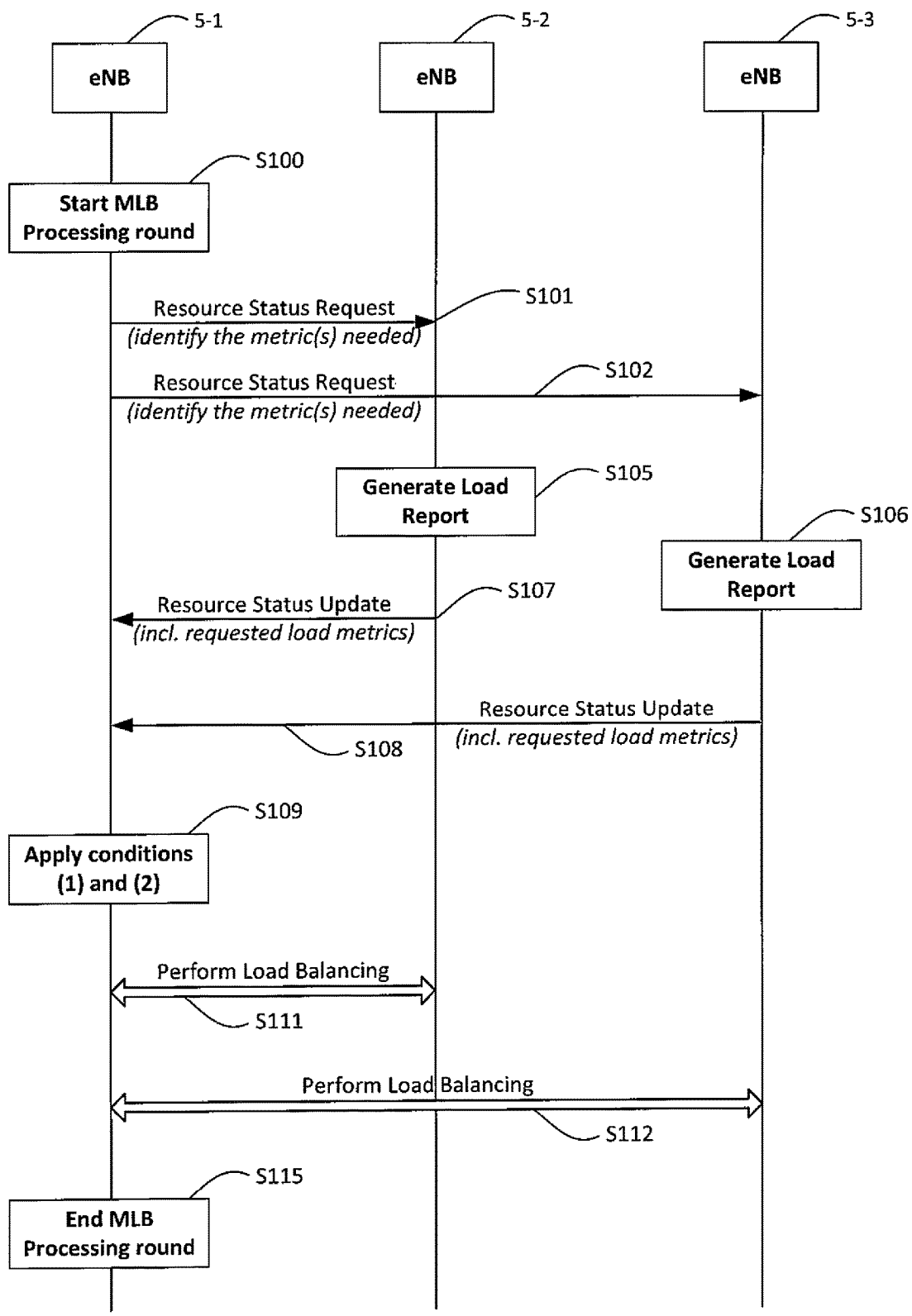
FIG. 9 is a timing diagram illustrating messages exchanged between elements of the telecommunications network of FIG. 1 whilst carrying out an exemplary embodiment of the invention.

FIG. 9 is a timing diagram illustrating messages exchanged between the base stations 5 of FIG. 1 whilst performing mobility load balancing in accordance with an embodiment of the present invention.

As can be seen, the procedure starts in step S100, in which the first base station 5-1 (using its MLB module 66) initiates the MLB processing in order to find out whether or not offloading is required, and to which cell. It will be appreciated that a round of such MLB procedure may be initiated either periodically, or upon detecting a trigger, such as the load in Cell A (or the hardware load of the first base station 5-1) reaching a predetermined threshold, percentage, and/or the like.

The first base station 5-1 (using its MLB module 66) thus generates and sends, in step S101, an appropriately formatted message (e.g. an X2 protocol message, such as a 'Resource Status Request' message) requesting the second base station 5-2 operating Cell B to provide load measurements (e.g. one or more of the metrics described in Tables 2 to 8 above) with respect to Cell B. The first base station's 5-1 message includes information (e.g. one or more information element) identifying the type of metric(s) required by the MLB module 66. If appropriate, the first base station 5-1 (using its MLB module 66) also generates and sends, in step S102, an appropriate message requesting the third base station 5-3 to provide load metrics for Cell C.

As shown in steps S105 and S106, in response to receiving the first base station's 5-1 request, each neighbour base station 5-2, 5-3 that have been requested to do so generates (using its reporting module 65) an appropriate load report for the cell operated by that second and third base station 5-2, 5-3 (following one or more appropriate load measurement by its load measurement module 64). The generated load report comprises one or more load metrics as described in Tables 2 to 8 above.

Next, in step S107, the second base station 5-2 (using its reporting module 65) transmits an appropriately formatted signalling message (e.g. an X2 protocol message, such as a 'Resource Status Update' message) to the first base station 5-1 and includes in this message the requested load metrics (e.g. one or more information elements as described in Tables 2 to 8) with respect to Cell B. Similarly, in step S108, the third base station 5-3 provides the requested load metrics (if any) with respect to Cell C (by sending another 'Resource Status Update' message or the like).

In step S109, the MLB module 66 of the requesting base station 5-1 determines, based on the received load metrics, whether offloading can be performed to one of the neighbour cells. Specifically, the MLB module 66 applies conditions (1) and (2) and/or conditions (1) and (2') described above. If the MLB module 66 determines that offloading cannot be performed, then the current MLB processing round ends. In this case, the MLB module may return to step S100 for the next MLB processing round (when appropriate).

Otherwise, if the MLB module 66 determines, in step S109, that offloading can be performed to Cell B, then the MLB module 66 initiates offloading towards the Cell B, by generating (using the handover control module 67) and sending, in step S111, an appropriately formatted signalling message (e.g. an X2 signalling message) causing some of the traffic (e.g. one or more communication bearer) to be moved (handed over) to the neighbour base station 5-2 operating Cell B.

Similarly, if the MLB module 66 determines, in step S109, that offloading can be performed to Cell C, then the MLB module 66 initiates offloading towards the Cell C, by generating (using the handover control module 67) and sending, in step S112, an appropriately formatted signalling message to the neighbour base station 5-2 operating Cell C initiating offloading towards Cell C.

As generally shown in FIG. 9, steps S111 and S112 may comprise a number of signalling messages being exchanged between the base stations 5 (and possibly any mobile communication device 3 being moved to a new serving cell).

Finally, in step S115, after having successfully completed the required offloading (if any) in steps S111 and/or S112, the MLB module 66 of the first base station 5-1 terminates processing of the current offloading round.

Modifications and Alternatives

A number of detailed exemplary embodiments have been described above. As those skilled in the art will appreciate, a number of modifications and alternatives can be made to the above exemplary embodiments whilst still benefiting from the inventions embodied therein. By way of illustration only a number of these alternatives and modifications will now be described.

While the above description addresses LTE networks and load measurements exchanged via the X2 interface, the description is also applicable to other load metrics and interfaces, and to non-LTE networks in which similar load metrics can be defined and exchanged between nodes.

In the above description of FIG. 9, the first base station is configured to initiate MLB processing with respect to two neighbour base stations. However, it will be appreciated that the first base station may initiate MLB processing with respect to any number of base stations, e.g. for a single base station or for three (or more) base stations, e.g. all base stations. It will also be appreciated that the MLB processing may be performed for a plurality of base stations (or cells) in a predetermined order, e.g. with respect to one base station/one cell at the time (in a round-robin fashion and/or the like). It will also be appreciated that each base station may initiate its own MLB procedure (e.g. concurrently), in which case each base station may be configured to request load metrics from a number of neighbour base station(s) and to provide load metrics for its own cell to any neighbour base station requesting such load metrics.

In the above description, the base station operating Cell A is configured to initiate offloading towards the neighbour cell(s) when predetermined conditions (1/2/2') are met. It will be appreciated that such offloading may comprise any appropriate action that would result in a potential reduction of the base station's load, e.g. by handover of one or more UEs to a neighbour cell (target cell). For example, the base station (using its handover control module) may be configured to adjust the applicable handover parameters for some (or all) UEs served via its Cell A. However, it will be appreciated that such actions/adjustments may not necessarily result in any UE being handed over to any of the target cells since such handovers may depend on other conditions as well (e.g. the base station operating the target cell and/or a core network entity may need to authorise such handovers).

In the above exemplary embodiments, a mobile telephone based telecommunications system was described. As those skilled in the art will appreciate, the techniques described in the present application can be employed in any communications system. In the general case, the base stations and the mobile communication devices can be considered as communications nodes or devices which communicate with each other. Other communications nodes or devices may include access points and user devices such as, for example, personal digital assistants, laptop computers, web browsers, and the like.

In the above description of condition (2'), the MLB function is configured to apply both an absolute and a relative threshold. However, it will be appreciated that the MLB function may apply only an absolute threshold or a relative threshold. In this case, condition (2') may be modified as:

for all other metrics $Q_k$ (with $k \neq i$): $Q_k(B) \leq \max(Q_k(A)+(M_1(k)-\delta(k)), Th(i,k))$ (2')

OR for all other metrics $Q_k$ (with $k \neq i$): $Q_k(B) \leq \max(Q_k(A)+(M_1(k)-\delta(k)), Q_i(A)-M_2(i,k))$.

In the above description of FIG. 9, specific signalling messages were given as examples (e.g. 'Resource Status Request' and 'Resource Status Update'). However, it will be appreciated that different signalling messages may also be used, for example any suitable X2 messages and/or the like.

In the above exemplary embodiments, a number of software modules were described. As those skilled will appreciate, the software modules may be provided in compiled or un-compiled form and may be supplied to the base station as a signal over a computer network, or on a recording medium. Further, the functionality performed by part or all of this software may be performed using one or more dedicated hardware circuits. However, the use of software modules is preferred as it facilitates the updating of the base station in order to update its functionality. Similarly, although the above exemplary embodiments employed transceiver circuitry, at least some of the functionality of the transceiver circuitry can be performed by software.

In one possibility, the first condition may comprise the following inequality:

$Q_i(A) \geq Q_i(B)+M_1(i)$ where '$Q_i(A)$' denotes said measurement result of said first type for said first cell; '$Q_i(B)$' denotes said measurement result of said first type for said second cell; and '$M_1(i)$' comprises a margin applicable to said measurement result of said first type.

In one possibility, the second condition may comprise the following inequality:

$Q_k(B) \leq Q_k(A)+(M_1(k)-\delta(k))$ where '$Q_k(A)$' denotes said measurement result of said second type for said first cell; '$Q_k(B)$' denotes measurement result of said second type for said second cell; '$M_1(k)$' comprises a margin applicable to said measurement result of said second type; and '$\delta(k)$' comprises a predetermined offset for said measurement of said second type.

In one possibility, the means for determining whether a second condition is met may be operable to perform said comparison of the respective measurement result of a second type for each of said first and second cells conditional on a comparison of said measurement result of a second type for said second cell with a threshold.

In one possibility, the second condition may comprise the following inequality:

$Q_k(B) \leq \max(Q_k(A)+(M_1(k)-\delta(k)), Th(i,k), Q_i(A)-M_2(i,k))$ where '$Q_i(A)$' denotes said measurement result of said first type for said first cell; '$Q_k(A)$' denotes said measurement result of said second type for said first cell; '$Q_k(B)$' denotes said measurement result of said second type for said second cell; '$M_1(k)$' comprises said margin applicable to said measurement result of said second type; '$\delta(k)$' comprises a predetermined offset for said measurement result of said second type; $Th(i,k)$ comprises said threshold; and $M_2(i,k)$ comprises a required difference between said measurement results of said first type for said first and second cells when considering said measurement result of said second type.

In one possibility, the first condition may further comprise a comparison of the measurement result of said first type to an activation threshold associated with said measurement result of said first type before considering said second condition. In this case, the first condition may comprise the following inequality:

$Q_i(A) \geq Th_{ACT}(i)$ where '$Q_i(A)$' denotes said measurement result of said first type for said first cell; and $Th_{ACT}(i)$ comprises said activation threshold for said measurement result of said first type.

In one possibility, the controlling means may be operable to initiate offloading from said first cell towards said second cell by updating a handover parameter associated with said first cell.

In one possibility, each of said measurement result of said first type and said measurement result of said second type may comprise a measurement selected from: a hardware load measurement for a specific cell (e.g. included in a 'Hardware Load Indicator' information element); a measurement of a core network interface (e.g. an S1 interface), such as a measurement of a transport network load experienced by said cell (e.g. included in an 'S1 TNL Load Indicator' information element); a measurement of a usage of physical radio blocks, PRBs, for all downlink and/or uplink traffic in said cell (e.g. included in a 'Radio Resource Status' information element); a measurement of an overall available resource level in a specific cell in downlink and/or uplink (e.g. included in a 'Composite Available Capacity Group' information element); a measurement of an overall available resource level in the cell of the base station in downlink and/or uplink (e.g. included in a 'Composite Available Capacity' information element); a measurement of an overall available resource level in the cell of the base station in uplink (e.g. included in a 'Composite Available Capacity' information element); a measurement of a load for a particular base station operating one or more cells; and a measurement of an amount of resources that are available at a particular base station relative to the total evolved universal terrestrial radio access network, E-UTRAN, resources of that base station.

In one possibility, the determining may perform said comparison of the respective measurement result of a second type for each of said first and second cells conditional on a result of a comparison of said measurement result of a second type for said second cell with a threshold.

Various other modifications will be apparent to those skilled in the art and will not be described in further detail here.

This application is based upon and claims the benefit of priority from United Kingdom Patent Application No. 1409630.9, filed on May 30, 2014, the disclosure of which is incorporated herein in its by reference.

The invention claimed is:

1. A base station operating a cell in a communication network comprising a plurality base stations each operating a respective cell for communicating with a plurality of user communication devices, the base station comprising:
 at least one processor configured to: obtain:
  i) a measurement result of a first type for a first cell operated by said base station;
  ii) information identifying a measurement result of said first type for a second cell operated by a different base station of said plurality of base stations;
  iii) a measurement result of a second type for said first cell; and
  iv) information identifying a measurement result of said second type for said second cell;
 determine whether a first condition is met based on a comparison of the respective measurement result of a first type for each of said first and second cells, wherein said first condition, when met, indicates that load should be offloaded from said first cell towards said second cell;
 determine whether a second condition is met based on a comparison of the respective measurement result of a second type for each of said first and second cells, wherein said second condition, when met, indicates that said different base station will not offload load from said second cell to said first cell based on the respective measurement result of a second type for each of said first and second cells; and
 control a load balancing based on said whether said first condition is met and said determining whether said second condition is met, when at least one of said first condition and said second condition is met, wherein said at least one processor is further configured to initiate offloading of load from said first cell towards said second cell.

2. The base station according to claim 1, wherein said first condition comprises the following inequality:

$$Q_i(A) \geq Q_i(B) + M_1(i)$$

where '$Q_i(A)$' denotes said measurement result of said first type for said first cell; '$Q_i(B)$' denotes said measurement result of said first type for said second cell; and '$M_1(i)$' comprises a margin applicable to said measurement result of said first type.

3. The base station according to claim 1, wherein said second condition comprises the following inequality:

$$Q_k(B) \leq Q_k(A) + (M_1(k) - \delta(k))$$

where '$Q_k(A)$' denotes said measurement result of said second type for said first cell; '$Q_k(B)$' denotes measurement result of said second type for said second cell; '$M_1(k)$' comprises a margin applicable to said measurement result of said second type; and '$\delta(k)$' comprises a predetermined offset for said measurement of said second type.

4. The base station according to claim 1, wherein the at least one processor is further configured determine whether a second condition is met is operable to perform said comparison of the respective measurement result of a second type for each of said first and second cells conditional on a comparison of said measurement result of a second type for said second cell with a threshold.

5. The base station according to claim 4, wherein said second condition comprises the following inequality:

$$Q_k(B) \leq \max(Q_k(A) + (M_1(k) - \delta(k)), Th(i,k), Q_i(A) - M_2(i,k))$$

where '$Q_i(A)$' denotes said measurement result of said first type for said first cell; '$Q_k(A)$' denotes said measurement result of said second type for said first cell; '$Q_k(B)$' denotes said measurement result of said second type for said second cell; '$M_1(k)$' comprises said margin applicable to said measurement result of said second type; '$\delta(k)$' comprises a predetermined offset for said measurement result of said second type; Th(i,k) comprises said threshold; and $M_2(i,k)$ comprises a required difference between said measurement results of said first type for said first and second cells when considering said measurement result of said second type.

6. The base station according to claim 1, wherein said first condition further comprises a comparison of the measurement result of said first type to an activation threshold associated with said measurement result of said first type before considering said second condition.

7. The base station according to claim 6, wherein said first condition comprises the following inequality:

$$Q_i(A) \geq Th_{ACT}(i)$$

where '$Q_i(A)$' denotes said measurement result of said first type for said first cell; and $Th_{ACT}(i)$ comprises said activation threshold for said measurement result of said first type.

8. The base station according to claim 1, wherein the at least one processor is further configured to initiate offloading from said first cell towards said second cell by updating a handover parameter associated with said first cell.

9. The base station according to claim 1, wherein each of said measurement result of said first type and said measurement result of said second type comprises a measurement selected from:
 a hardware load measurement for a specific cell;
 a measurement of a core network interface, such as a measurement of a transport network load experienced by said cell;
 a measurement of a usage of physical radio blocks, PRBs, for all downlink and/or uplink traffic in said cell;
 a measurement of an overall available resource level in a specific cell in downlink and/or uplink;
 a measurement of an overall available resource level in the cell of the base station in downlink and/or uplink;
 a measurement of a load for a particular base station operating one or more cells; and
 a measurement of an amount of resources that are available at a particular base station relative to the total evolved universal terrestrial radio access network, E-UTRAN, resources of that base station.

10. A base station operating a cell in a communication network comprising a plurality base stations each operating a respective cell for communicating with a plurality of user communication devices, the base station comprising a transceiver and at least one processor, wherein:
 said transceiver is configured to obtain:
  i) a measurement result of a first type for a first cell operated by said base station;
  ii) information identifying a measurement result of said first type for a second cell operated by a different base station of said plurality of base stations;
  iii) a measurement result of a second type for said first cell; and
  iv) information identifying a measurement result of said second type for said second cell; and
 said at least one processor is configured to:
  determine whether a first condition is met based on a comparison of the respective measurement result of a first type for each of said first and second cells, wherein said first condition, when met, indicates that load should be offloaded from said first cell towards said second cell;

determine whether a second condition is met based on a comparison of the respective measurement result of a second type for each of said first and second cells, wherein said second condition, when met, indicates that said different base station will not offload load from said second cell to said first cell based on the respective measurement result of a second type for each of said first and second cells; and control a load balancing based on said determining whether said first condition is met and said determining whether said second condition is met, when at least one of said first condition and said second condition is met, wherein said processor is operable to initiate offloading of load from said first cell towards said second cell.

11. A system comprising the base station according to claim 1, a base station operating said second cell, and at least one user communication device.

12. A method performed by a base station operating a cell in a communication network comprising a plurality base stations each operating a respective cell for communicating with a plurality of user communication devices, the method comprising:

obtaining:
i) a measurement result of a first type for a first cell operated by said base station;
ii) information identifying a measurement result of said first type for a second cell operated by a different base station of said plurality of base stations;
iii) a measurement result of a second type for said first cell; and
iv) information identifying a measurement result of said second type for said second cell;

determining whether a first condition is met based on a comparison of the respective measurement result of a first type for each of said first and second cells, wherein said first condition, when met, indicates that load should be offloaded from said first cell towards said second cell;

determining whether a second condition is met based on a comparison of the respective measurement result of a second type for each of said first and second cells, wherein said second condition, when met, indicates that said different base station will not offload load from said second cell to said first cell based on the respective measurement result of a second type for each of said first and second cells; and controlling a load balancing based on said determining whether said first condition is met and said determining whether said second condition is met, when at least one of said first condition and said second condition is met, wherein said controlling is operable to initiate offloading of load from said first cell towards said second cell.

13. The method according to claim 12, wherein said determining performs said comparison of the respective measurement result of a second type for each of said first and second cells conditional on a result of a comparison of said measurement result of a second type for said second cell with a threshold.

14. A non-transitory computer implementable instructions recording medium storing computer implementable instructions for causing a programmable communications device to perform operations comprising:

obtaining:
i) a measurement result of a first type for a first cell operated by said base station;
ii) information identifying a measurement result of said first type for a second cell operated by a different base station of said plurality of base stations;
iii) a measurement result of a second type for said first cell; and
iv) information identifying a measurement result of said second type for said second cell;

determining whether a first condition is met based on a comparison of the respective measurement result of a first type for each of said first and second cells, wherein said first condition, when met, indicates that load should be offloaded from said first cell towards said second cell;

determining whether a second condition is met based on a comparison of the respective measurement result of a second type for each of said first and second cells, wherein said second condition, when met, indicates that said different base station will not offload load from said second cell to said first cell based on the respective measurement result of a second type for each of said first and second cells; and controlling a load balancing based on said determining whether said first condition is met and said determining whether said second condition is met, when at least one of said first condition and said second condition is met, wherein said controlling is operable to initiate offloading of load from said first cell towards said second cell.

* * * * *